Aug. 1, 1950

H. HARRIS, JR
MOTOR CONTROL 2,516,868

Filed Nov. 23, 1944

INVENTOR
*HERBERT HARRIS, JR.*
BY *Paul B. Hunter*
ATTORNEY

Aug. 1, 1950  H. HARRIS, JR  2,516,868
MOTOR CONTROL
Filed Nov. 23, 1944  2 Sheets-Sheet 1

INVENTOR
HERBERT HARRIS, JR.
BY Paul B. Hunter.
ATTORNEY

Patented Aug. 1, 1950

2,516,868

UNITED STATES PATENT OFFICE 2,516,868

MOTOR CONTROL

Herbert Harris, Jr., Cedarhurst, N. Y., assignor to The Sperry Corporation, a corporation of Delaware Application November 23, 1944, Serial No. 564,831

3 Claims. (Cl. 318—308)

This invention relates to motor controls, and more particularly to an improved method of and means for controlling the speed of an electric motor.

In the past, one of the well-known arrangements for controlling the speed of an electric motor has utilized a centrifugal governor mounted on or driven from the motor shaft. The governor was provided with a pair of make-and-break contacts, and these contacts functioned as a simple single-pole, single-throw switch. This switch was connected in circuit with one or more of the windings of the motor in such a manner that the torque of the motor was changed as the governor contacts opened and closed. For example, the governor contacts in one arrangement were connected in shunt with a resistor in series with the armature winding of the motor, so that when the contacts were closed, full torque was developed; and when the contacts were open, the torque was reduced due to the introduction of resistance in the armature circuit.

An analysis of the type of motor speed control briefly described above has shown that the governor contacts, when the motor was running at a speed close to the nominal speed for which the control had been adjusted, vibrated at a frequency of several hundred cycles per second. The contacts remained closed, and full torque was accordingly developed, only when the speed fell substantially below the nominal value. Similarly the contacts remained open, and hence the torque remained at its reduced value, only at a speed substantially higher than the nominal value.

Accordingly, the regulation of the motor was determined by the difference between the two speeds corresponding to these two steady-state conditions of the governor contacts. This relatively wide region could be narrowed to some extent by improving the smoothness with which the motor operated, as for example by increasing the inertia of its rotating parts, but the regulation still fell considerably short of requirements for particular applications. Another disadvantage of the arrangement above described was that the governor contacts necessarily carried a relatively large current, with attendant difficulties due to arcing and pitting.

Accordingly, it is an object of the present invention to provide an improved motor control adapted to secure speed regulation within very close limits.

It is another object of the invention to provide an improved speed control equally applicable to alternating-current or direct-current motors.

It is still another object of the invention to provide a motor speed control employing vibrating contacts, in which the current carried by the contacts is relatively small.

An additional object of the invention is to provide a motor speed control in which electrical means are provided for compensation of the effect of temperature changes upon mechanical elements of the speed control.

A further object of the invention is to provide a motor speed control adapted to apply dynamic braking to the motor when the load tends to drive the latter at a higher than normal speed.

In accordance with the present invention, it is proposed to utilize a centrifugal governor mounted on or driven from the motor shaft, not directly as in the prior art, but indirectly in a manner to be described more fully below, to control the energization of one or more windings of the motor. In this manner, an improvement in the regulation of the order of ten to one is readily realized, and the current which the governor contacts are called upon to carry is substantially reduced. Briefly, the present invention contemplates developing a voltage which is a function of the percentage of time during which the vibrating governor contacts are closed, and utilizing this voltage to vary the torque of the motor. This voltage is roughly proportional to the error in speed, and is developed within the relatively narrow speed range in which the contacts vibrate. By amplifying this voltage, it is possible to secure full torque variation over a still narrower range of speed.

The invention also contemplates means for reversing the polarity of the control voltage in accordance with speed variations of the motor, and utilizing this control voltage to reverse the torque of the motor and hence provide dynamic braking when the load tends to drive the motor above its normal speed.

The invention in another of its aspects relates to novel features of the instrumentalities described herein for achieving the principal objects of the invention and to novel principles employed in those instrumentalities, whether or not these features and principles are used for the principal objects or in the same field.

The above and other objects and features of the invention will be better understood by reference to the following description taken in connection with the accompanying drawings, in which like components are designated by like reference numerals and in which.

Figures 1, 3:
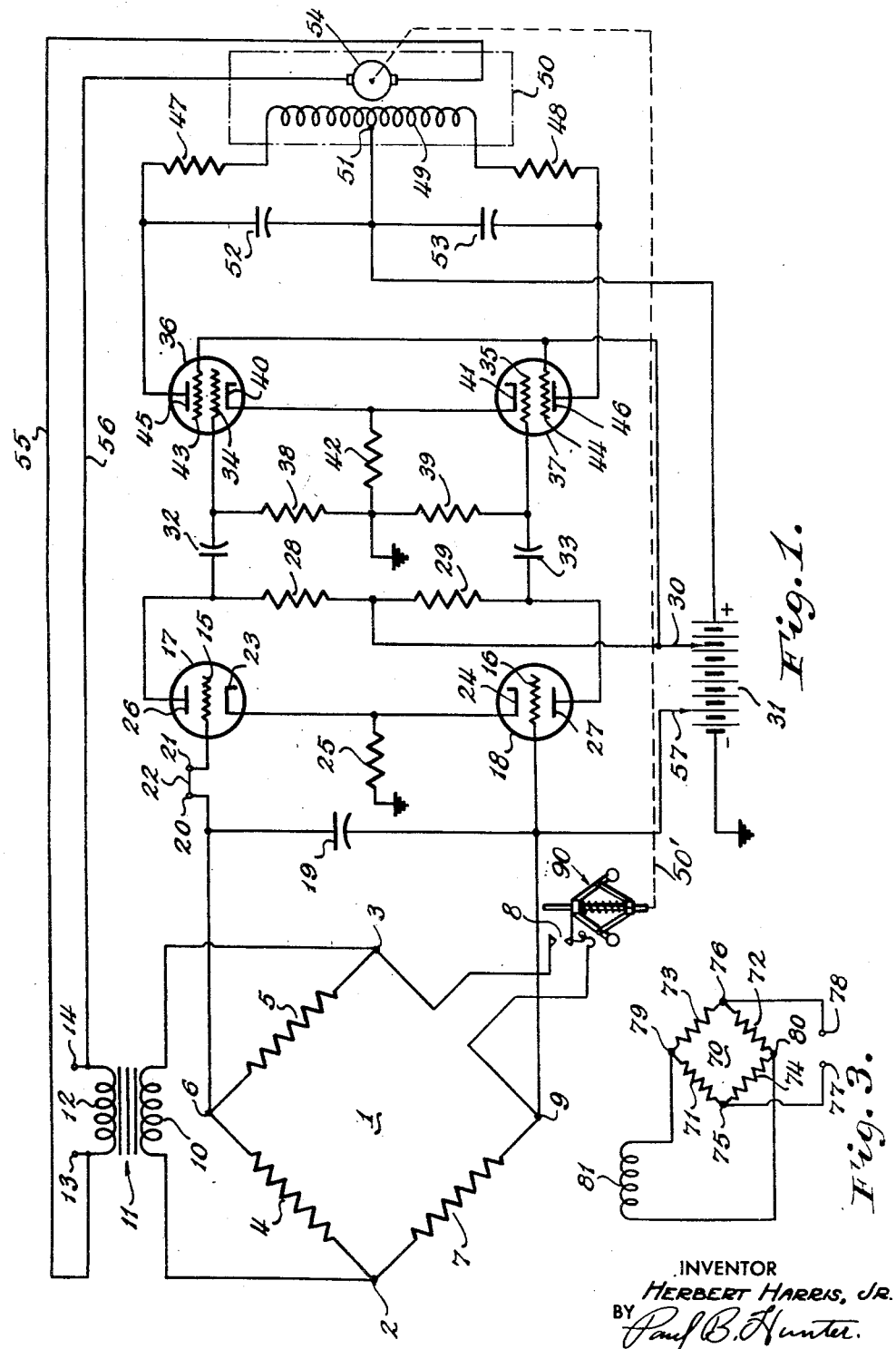
Fig. 1 is a schematic diagram of a motor control in accordance with the present invention especially applicable for use with alternating-current motors.
Fig. 3 shows schematically a temperature compensation arrangement especially adapted for use with the motor control of Fig. 1.

Referring to Fig. 1 of the drawings, there is shown a bridge-like network 1 comprising, between its junctions 2 and 3, a first branch having resistors 4 and 5 in series, their junction being designated 6; and a second branch including resistor 7 and governor contacts 8 in series, the junction of the latter components being designated 9. Junctions 2 and 3 are connected to secondary winding 10 of a transformer 11, the primary winding 12 of which is connected to terminals 13 and 14. A source of alternating potential (not shown) is connected to the latter terminals. This source may be, for example, the usual 115-volt, 60-cycle power mains.

Junctions 6 and 9 of bridge 1 are connected respectively to control electrodes or grids 15 and 16 of electron discharge devices 17 and 18. Junctions 6 and 9 are also shunted by a capacitor 19. Interposed between junction 6 and grid 15 of device 17 are a pair of terminals 20 and 21 which are joined by link 22. The purpose of these terminals will be brought out later in connection with Fig. 3.

Cathodes 23 and 24, respectively of devices 17 and 18, are connected together and to ground through common cathode resistor 25. Plates 26 and 27, of devices 17 and 18, are connected respectively through load resistors 28 and 29 to a suitable source of positive potential indicated by tap 30 on potential source 31, the negative terminal of which is grounded. Grid 16 of device 18 is connected to tap 57 on potential source 31 intermediate tap 30 and ground. The potentials at taps 30 and 57 and the value of cathode resistor 25 are so chosen that grids 15 and 16 are normally slightly less positive with respect to ground than are cathodes 23 and 24.

Plates 26 and 27 are coupled by means of capacitors 32 and 33 to control grids 34 and 35 of electron discharge devices 36 and 37. Control grids 34 and 35 are respectively connected to ground through resistors 38 and 39. Cathodes 40 and 41 of devices 36 and 37 are connected together and to ground by means of common cathode resistor 42.

Screen grids 43 and 44 of devices 36 and 37 are connected to a suitable source of positive potential, as for example tap 30 on source 31. Plates 45 and 46 of devices 36 and 37 are connected, respectively through resistors 47 and 48, to the end terminals of center-tapped field winding 49 of motor 50. The center tap 51 of winding 49 is connected to a suitable source of positive potential, as for example the positive terminal of source 31. A capacitor 52 is connected between plate 45 and center tap 51, and a capacitor 53 is connected between plate 46 and center tap 51. Capacitors 52 and 53 tend to resonate with the inductance of winding 49 to provide a resistive load, at the frequency of the source connected to terminals 13 and 14, for devices 36 and 37. Resistors 47 and 48 are optionally employed so that this resonance is relatively broad and hence comparatively insensitive to frequency variations.

The armature 54 of motor 50 is connected to a suitable source of alternating potential, as for example to terminals 13 and 14, by means of leads 55 and 56, either directly as shown or, in some cases, through a suitable phase shifter (not shown). Phase shift may also be introduced, if necessary, in the voltage source of the bridge circuit itself. In either case, the phase of the potential applied to armature 54 with respect to that of the field winding 49 is preferably so adjusted as to provide maximum torque when contacts 8 are closed. The shaft 50' of motor 50, the speed of which is to be regulated, either carries directly or drives the centrifugal governor 90 or the like of which contacts 8 are a part.

In operation, let it first be assumed that the circuit including secondary winding 10 of transformer 11 is open, so that no potential is applied between junctions 2 and 3 of bridge 1. Devices 17 and 18 operate as a class A amplifier, as do devices 36 and 37. Since no alternating-current input is applied to the bridge under the condition being considered, field winding 49 receives no excitation. Motor 50, therefore, does not run.

Now let it be assumed that winding 10 is connected in circuit as shown, and that an alternating potential is therefore being applied between junctions 2 and 3 of bridge 1. Let it further be assumed that motor 50 is running in a given direction, as for example clockwise, at a speed such that contacts 8 are open. In this case, resistors 4 and 5 operate as a voltage divider and, since no appreciable grid current flows, the presence of resistor 7 can be ignored at the moment. Accordingly, an alternating signal potential is developed between junctions 6 and 9 and hence applied between grids 15 and 16 of devices 17 and 18, this potential being less than that present across secondary winding 10 of transformer 11, its magnitude depending upon the relative values of resistors 4 and 5.

Since grid 16 remains substantially at ground potential as far as signal voltages are concerned, because of its connection to tap 57 on source 31, any potential applied between grids 15 and 16 is effectively applied only to grid 15. Because of the relatively large common cathode resistor 25 in the cathode circuits of devices 17 and 18, these devices together function as a cathode phase-inversion amplifier in the manner disclosed by Otto H. Schmitt in the Review of Scientific Instruments, volume 12, No. 11, pages 548–551, November 1941. Accordingly, such a signal appears almost symmetrically amplified, but in opposite phase, in the two plate circuits. An amplified version of the potential of the signal voltage appearing between junctions 6 and 9 is applied to control electrodes 34 and 35 by devices 36 and 37 with a first phase reversal, and a still more amplified version of the same signal potential appears across field winding 49 of motor 50 with a second phase inversion. It will be apparent therefore that with contacts 8 open, the potential developed across field winding 49 will substantially correspond in phase with, but will be substantially greater in magnitude than, the potential appearing across secondary winding 10 of transformer 11. Since armature 54 of motor 50 is energized from the same source as transformer 11, motor 50 rotates in the given direction.

Assuming now that contacts 8 are closed, it will be apparent that resistors 4 and 5 again serve as a voltage divider to provide a voltage between junctions 2 and 6 which in this case is applied in a sense such as to oppose the total voltage between junctions 2 and 3, this total voltage appearing across resistor 7. Accordingly, the potential developed between junctions 6 and 9, and hence applied between grids 15 and 16, has a value less than the voltage between junctions 2 and 3, but in this case is reversed in phase. Its magnitude depends upon the relative values of resistors 4, 5 and 7. The application of such a voltage between grids 15 and 16 results in an energization of field winding 49 of opposite phase compared with that obtained when contacts 8 were open.

Accordingly, motor 50 rotates in the direction which, making the same assumption as before, would be counterclockwise.

In accordance with the present invention, capacitor 19 is utilized effectively to integrate or average the output of bridge 1 as contacts 8 vibrate open and closed at a rapid rate, which is high compared with the frequency of the voltage applied to terminals 13 and 14. Let it be assumed that the desired direction of rotation is counterclockwise and that, accordingly, contacts 8 remain closed for a substantially larger percentage of the time than they remain open. Under these circumstances, motor 50 will rotate in a counterclockwise direction, full torque being developed to produce rotation in this direction whenever contacts 8 are closed for sufficient time fully to charge capacitor 19 through the resistance of the bridge arms during each half cycle of the alternating wave. The presence of capacitor 19 prevents an opening of contacts 8 from instantaneously causing a complete reversal of torque, since the voltage of opposite phase which is momentarily developed by bridge 1 merely reduces the charge on capacitor 19 without reversing it.

Thus it will be apparent that capacitor 19 functions to average or integrate the output of bridge 1, in such a manner that grids 15 and 16 are supplied with a signal voltage, the magnitude of which varies relatively slowly in accordance with changing torque requirements. Accordingly, the relatively high-frequency component due to the vibration of contacts 8 is effectually filtered out. In addition to their previously mentioned primary function, capacitors 52 and 53 tend also to remove any trace of this component which might remain and to provide a limited averaging or integrating effect. Capacitor 19 accordingly may be omitted without rendering the speed control of the present invention inoperative, but its use provides substantially enhanced speed regulation.

Figure 2:
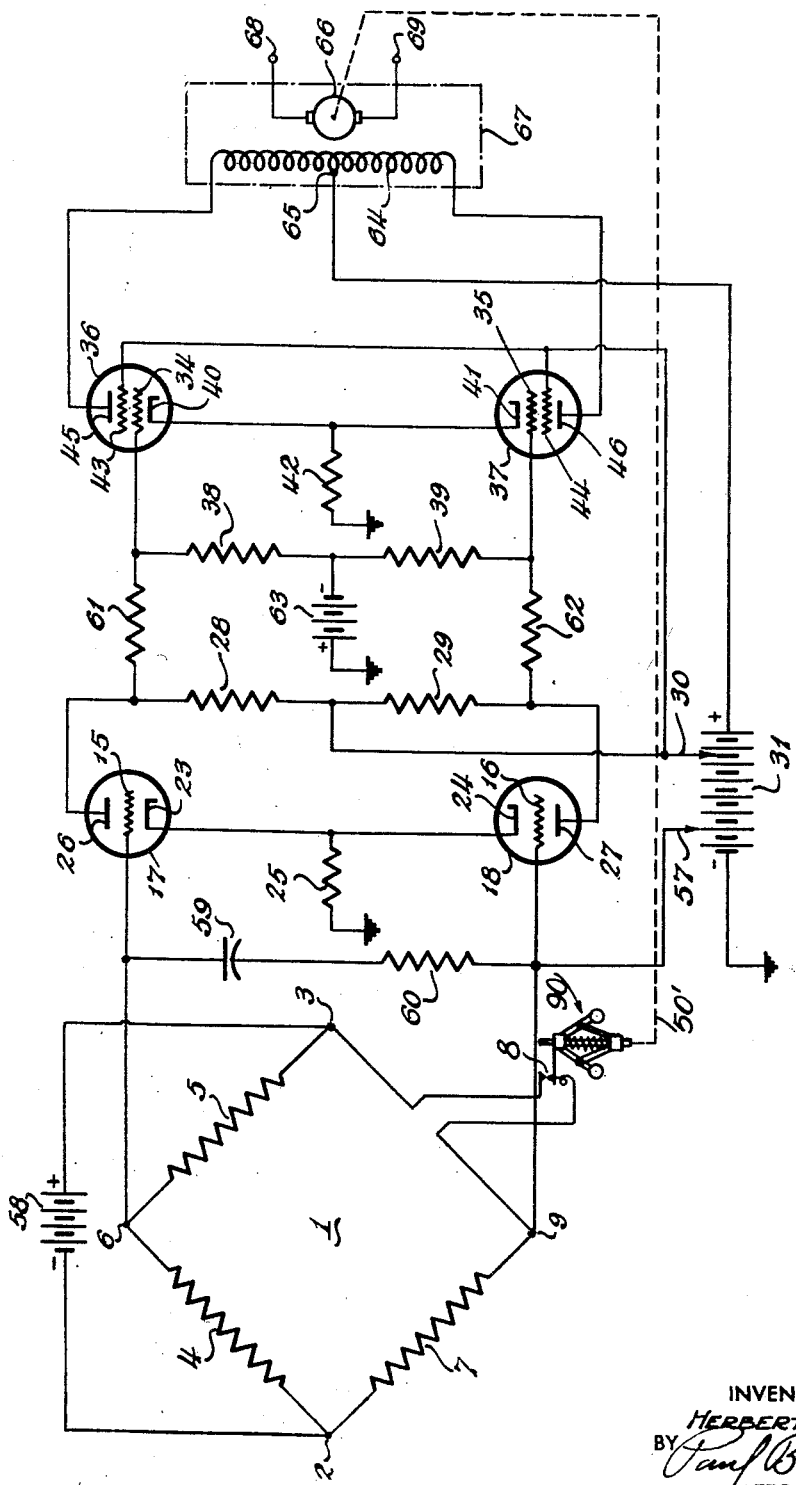
Fig. 2 shows in schematic form a speed control in accordance with the present invention intended for use with direct-current motors.

The speed control shown in Fig. 2 of the drawings is similar to that shown in Fig. 1 and described above, except that it is adapted for use with a direct-current motor. A battery 58 is connected between junctions 2 and 3 of bridge 1. A series network comprising capacitor 59 and resistor 60 is connected between junctions 6 and 9. Plates 26 and 27 of electron discharge devices 17 and 18 are conductively coupled to control grids 34 and 35 of devices 36 and 37 by means of resistors 61 and 62. The junction of resistors 38 and 39 is connected to the negative terminal of a potential source 63, the positive terminal of which is grounded.

Plates 45 and 46 are connected directly to the end terminals of field winding 64, the center tap 65 of which is connected to the positive terminal of potential source 31. Armature 66 of motor 67 is connected between terminals 68 and 69, to which is connected a source of direct-current power (not shown) which may, for example, comprise the usual 115-volt direct-current power mains.

In operation, with contacts 8 closed, a portion of the potential of source 58 appears between junctions 6 and 9, and charges capacitor 59 through resistor 60. With the polarity of source 58 as indicated in the drawing, capacitor 59 is charged in a direction which tends to make grid 15 negative with respect to grid 16. This difference in potential between grids 15 and 16 is amplified by devices 17 and 18 functioning as a cathode phase-inversion amplifier, and by devices 36 and 37 functioning as an ordinary push-pull amplifier. Thus the plate current of device 36 increases, whereas that of device 37 decreases, so that field winding 64 develops a magnetic flux which causes motor 67 to rotate in a direction which may be assumed to be the desired counterclockwise rotation.

Now let it be assumed that motor 67 has sufficiently exceeded the desired speed to cause contacts 8 to open. A potential of opposite polarity now appears between junctions 6 and 9, thus tending to discharge capacitor 59 through resistor 60. Grid 15 thus becomes less negative with respect to grid 16, and the energization of field winding 64 is accordingly altered in the proper sense to produce a torque tending to restore the motor to the desired speed.

Assuming, as before in the case of the system of Fig. 1, that a counterclockwise rotation of the motor is normally desired, contacts 8 will remain closed a larger percentage of the time than they are open, so that capacitor 59 will be continually charged with the same polarity. The magnitude of the charge, however, will vary from time to time as contacts 8 alternate between open and closed. The values of capacitor 59 and resistor 60 are so chosen that the change in potential between grids 15 and 16 takes place relatively slowly compared with the rate at which contacts 8 vibrate during normal operation, but relatively rapidly compared with the rate of speed change. In this manner, a small change in the speed of the motor is utilized to develop a large torque in the proper sense to compensate for the speed change.

Centrifugal governors of the type especially adapted for use in the speed control of the present invention have been found to be noticeably temperature sensitive, that is, the speed range of the motor within which the contacts vibrate varies as the ambient temperature changes. While it is sometimes possible substantially to overcome this disadvantage by employing a spring material in the governor having a zero coefficient of elasticity with temperature, choosing and utilizing exactly the proper material is often extremely difficult.

It is an additional feature of the present invention, accordingly, to provide electrical means adapted substantially to compensate for the effect of temperature changes upon the mechanical elements of the governor. Such an arrangement, especially adapted for use with the control of Fig. 1, is shown in Fig. 3 of the drawings.

Referring to Fig. 3, there is shown a bridge 70 comprising elements 71 and 72 each having a relatively low temperature coefficient of resistivity, and elements 73 and 74 each having a relatively high temperature coefficient of resistivity. Junctions 75 and 76 of bridge 70 are connected respectively to terminals 77 and 78, which in turn are connected to terminals 20 and 21 of Fig. 1, it being assumed that link 22 in that figure is removed. Junctions 79 and 80 of bridge 70 are connected to the terminals of a suitable source of alternating-current potential, which may, for example, comprise an additional secondary winding 81 on transformer 11 of Fig. 1.

In operation, elements 71, 72, 73 and 74 of bridge 70 are located in the vicinity of the governor and are so chosen that the bridge is balanced when these elements are subjected to a temperature corresponding to that temperature at which the governor requires no compensation, hereafter referred to as the normal operating temperature. When bridge 70 is balanced, no potential appears between junctions 75 and 76, so that the additional arrangement of Fig. 3 has no effect upon the operation of the system of Fig. 1.

Let it now be assumed that the ambient temperature shifts appreciably away from the normal operating temperature. In this case, bridge 70 will be unbalanced since the resistance of elements 71 and 72 remains substantially unchanged, whereas that of elements 73 and 74 changes appreciably. The resultant unbalance of the bridge will cause a potential to appear between junctions 75 and 76, and the vector sum of this potential and that appearing across capacitor 19 of Fig. 1 will be the potential which is actually applied to grids 15 and 16. By properly phasing winding 81 with respect to winding 10, the compensating potential appearing at terminals 77 and 78 may be given the correct phase to influence the torque and hence the speed of motor 50 in a sense substantially to compensate for the effect of temperature upon the motor speed range within which vibration of the governor contacts occurs.

The precision with which temperature compensation can be secured depends principally upon the proper choice of materials for elements 71, 72, 73 and 74 of bridge 70. The temperature coefficient of resistivity of elements 73 and 74 should preferably be of the order of ten times that of elements 71 and 72. By way of example, elements 71 and 72 may be made of nichrome, which has a temperature coefficient of 0.0004 per °C.; and elements 73 and 74 may be of annealed copper having a temperature coefficient of resistivity of 0.00393 per °C. It is assumed, of course, that the elements of bridge 70 are subjected to substantially the same ambient temperature as are governor contacts 8.

It will be understood that the arrangement of Fig. 3 may be employed equally well with the system of Fig. 2. In this case, winding 81 is simply replaced by a suitable source of direct-current potential having the proper magnitude and polarity with respect to those of source 56. Terminals 77 and 78 are then connected in series with grid 15 of device 17.

In one successful embodiment in accordance with Fig. 1 of the drawings, the potential of secondary winding 10 of transformer 11 was 30 volts. Electron discharge devices 17 and 18 each comprised one-half of a type 6SL7 tube. Discharge devices 36 and 37 each comprises a type 6V6 tube.

Motor 50 was a Diehl model 803,010 of the universal type, in which each half of field winding 49 comprised 2,000 turns of B. and S. No. 34 wire. Potential source 31 had a total voltage of 300 volts, and positive taps 57 and 30 were respectively at approximately 80 and 250 volts.

The following values of resistors and capacitors were employed:

Resistors 4, 5 and 7 _____ megohm__ 0.15
Resistor 25 _____ do____ 0.25
Resistors 28, 29, 38 and 39 _____ do____ 0.5
Resistors 42, 47 and 48 _____ ohms__ 500
Capacitor 19 _____ microfarads__ 0.02
Capacitors 32 and 33 _____ do____ 0.05
Capacitors 52 and 53 _____ do____ 1.5

Inertia was added to the armature shaft in the form of a disc of brass 3.75 inches in diameter and 0.75 inch long. This particular embodiment was found to maintain the desired speed within 0.025% per inch-ounce of change in the load.

None of the constants above stated were found to be at all critical, and any of them could be varied within wide limits without substantially affecting the performance of the speed control.

It will be understood that many modifications can be made from the above-described embodiments of the invention, without departing from the scope thereof. For example, the amplifier of Figs. 1 and 2 may be of other type or employ more or less than the two stages there shown, and coupling between stages other than the resistance-capacitance coupling of Fig. 1 may be employed, as for example transformers. It will also be understood that bridge 1 of Figs. 1 and 2 functions merely as a phase- or polarity-reversing switch, and that the function of this bridge may equally well be performed in other manners, as for example by employing electronic switching. The circuits may be arranged, if desired, to secure the chosen direction of rotation with the contacts normally open a larger part of the time. Bridge 1 has thus been shown and described in this specification merely as an example of one arrangement in which the opening and closing of a single pair of contacts may be made functionally the equivalent of a reversing switch which normally would have two poles and be of the double-throw type.

The addition of inertia to the armature shaft is optional and in no sense necessary for the satisfactory operation of the invention. Whether and how much inertia to add depends both upon the inherent inertia of the motor to be controlled and upon the degree of precision of speed control to be achieved. The addition of inertia to the armature shaft, however, permits a higher degree of amplification to be employed without causing instability, thus allowing an extremely precise speed control to be realized if desired.

The ability of the speed control of the present invention actually to reverse the torque of the motor, rather than merely to increase or decrease it, is especially advantageous in applications where the motor load is other than passive. A motor which is used to drive a rolling vehicle, for example, is frequently subjected to being driven above its normal speed due to motion of the vehicle caused by gravity. The dynamic braking provided by the arrangements of the present invention under such circumstances opposes overspeed drive by the load and tends to restore the motor to its normal speed. This feature cannot be realized in motor speed controls in which the torque is merely increased or decreased without reversal.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a motor speed control, a first bridge network including a plurality of impedances and a pair of speed responsive contacts; a first source of potential connected to one diagonal of said first bridge network; voltage-averaging means connected to the other diagonal of said first bridge network; a second bridge network comprising two pairs of opposite arms, said pairs having substantially different temperature coefficients of resistivity; a second source of potential connected to one diagonal of said second bridge network; potential-combining connections between the other diagonal of said second bridge network and the output terminals of said voltage-averaging means; and means for utilizing the resultant combined output potential to develop a winding-energizing voltage.

2. In a motor speed control, a first bridge network including a plurality of impedances and a pair of speed responsive contacts; a first source of potential connected to one diagonal of said first bridge network; voltage-averaging means connected to the other diagonal of said first bridge network; a second bridge network comprising two pairs of opposite arms, said pairs having substantially different temperature coefficients of resistivity; a second source of potential connected to one diagonal of said second bridge network; potential-combining connections between the other diagonal of said second bridge network and the output terminals of said voltage-averaging means; and means for amplifying the resultant combined output potential to develop a winding-energizing voltage.

3. In a motor speed control, a governor having a pair of vibrating contacts, said governor being connected to the output shaft of the motor, a first bridge circuit utilizing said contacts in an arm thereof, a source of voltage connected across the first diagonal of said first bridge circuit, a second bridge circuit one arm of which comprises a temperature sensitive element, a source of voltage connected across the first diagonal of said second bridge circuit, circuit means for combining the voltages developed across the second diagonal of said first and second bridges, and circuit means connecting the output of said combining means to said motor.

HERBERT HARRIS, Jr.

REFERENCES CITED

The following references are of record in the file of this patent:

UNITED STATES PATENTS

| Number | Name | Date |
|---|---|---|
| 1,485,409 | Miller | Mar. 4, 1924 |
| 1,844,243 | Crout | Feb. 9, 1932 |
| 1,954,884 | Mears | Apr. 17, 1934 |
| 2,103,589 | Lee et. al. | Dec. 28, 1937 |
| 2,217,478 | Gulliksen | Oct. 8, 1940 |
| 2,366,500 | Eastin | Jan. 2, 1945 |
| 2,384,380 | Isserstedt | Sept. 4, 1945 |